April 28, 1931. H. A. CUMFER 1,802,880
METHOD OF MANUFACTURE OF LAMINATED FIBROUS STRUCTURES
Filed March 31, 1930 3 Sheets-Sheet 2
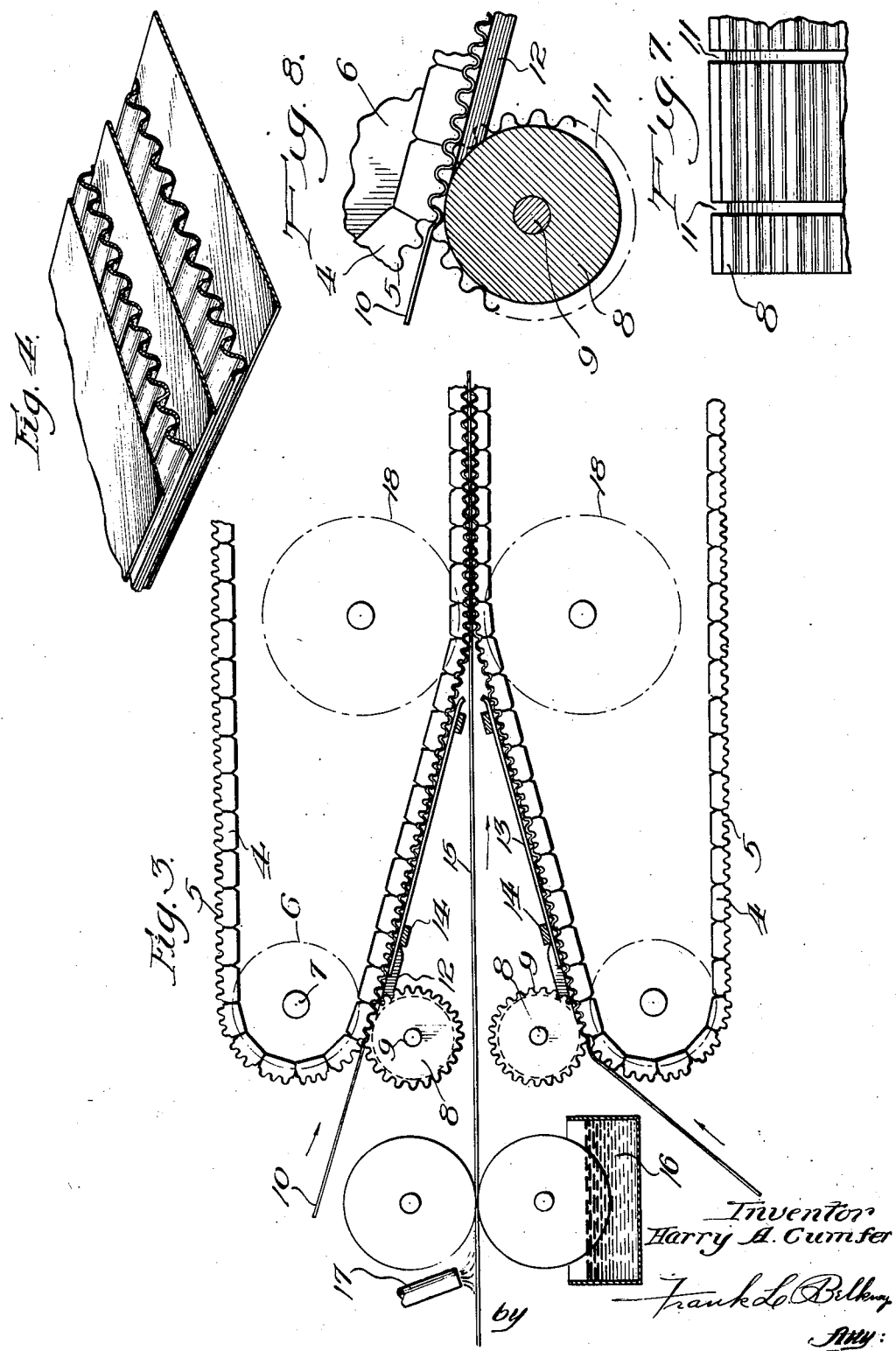

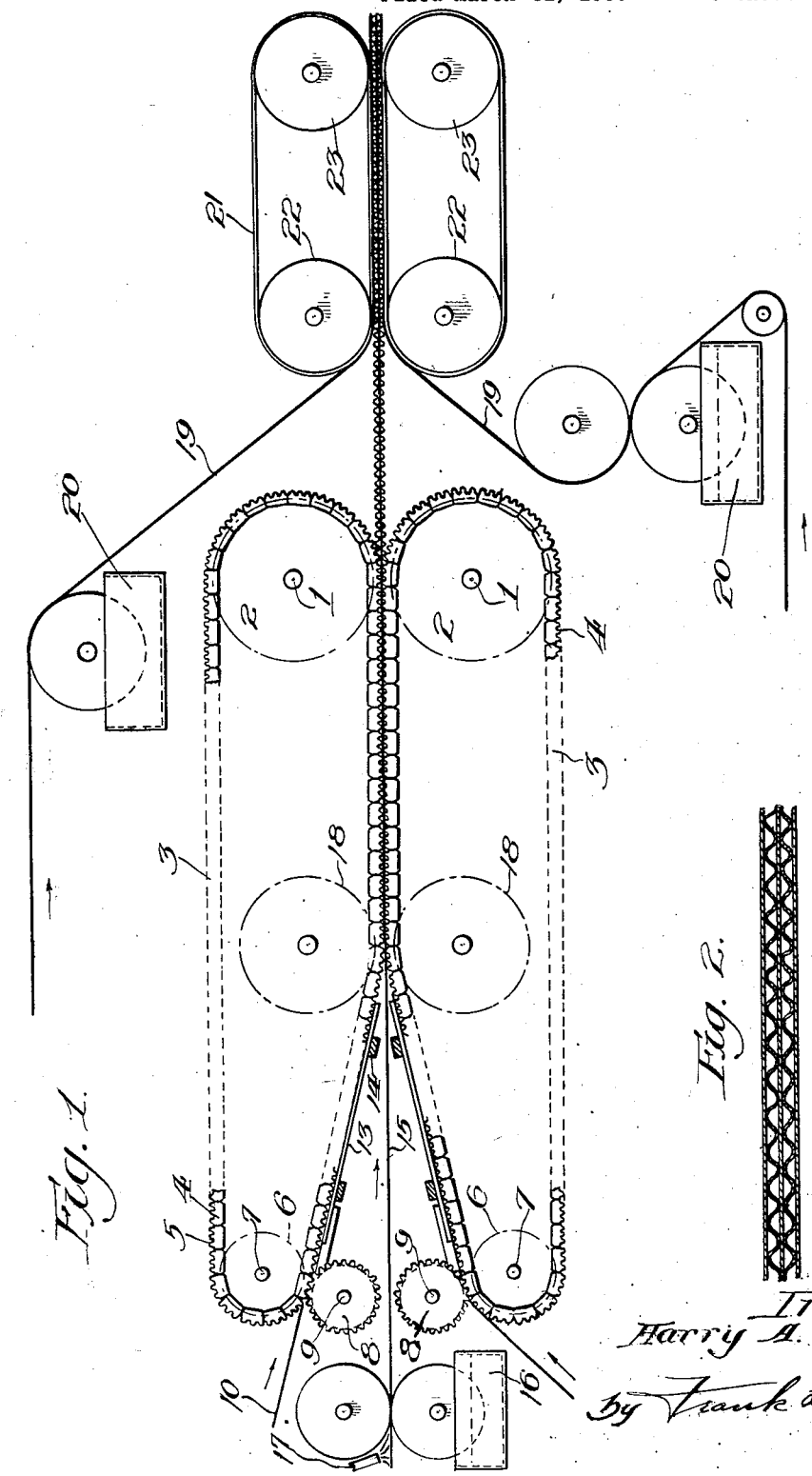

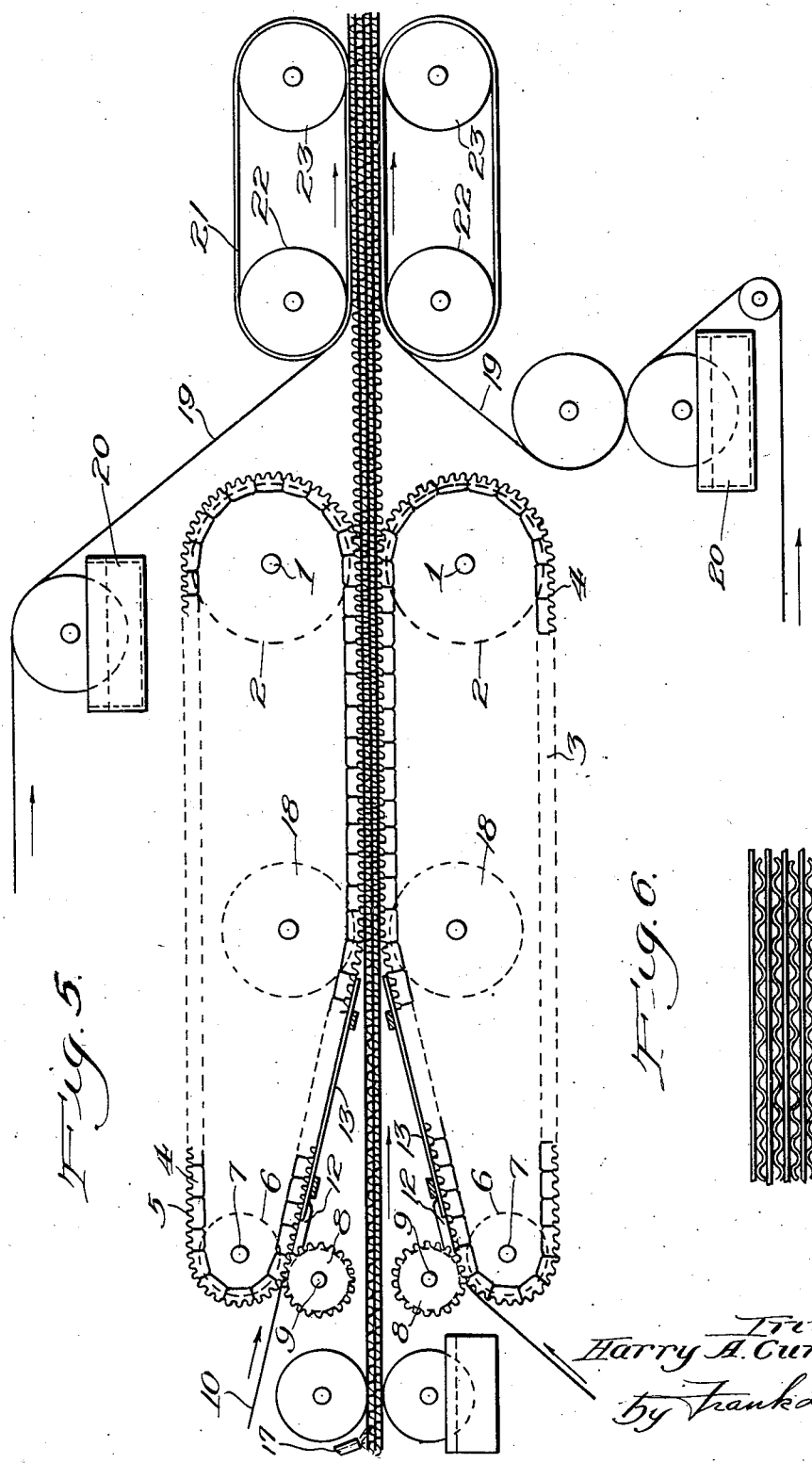

Patented Apr. 28, 1931

1,802,880

UNITED STATES PATENT OFFICE

HARRY A. CUMFER, OF CHICAGO, ILLINOIS, ASSIGNOR OF ONE-HALF TO WILLARD J. MASON, OF GREENWICH, CONNECTICUT

METHOD OF MANUFACTURE OF LAMINATED FIBROUS STRUCTURES

Application filed March 31, 1930. Serial No. 441,155.

This application is a continuation in part of my co-pending application Serial No. 129,383, filed August 16, 1926.

The present invention relates to the manufacture of a laminated fibrous structure and, in one specific embodiment, the invention comprises a method whereby a relatively flexible fibrous sheet is continuously fed at an angle and adhesively united to a fibrous base sheet moving in a straight line, the arrangement being such that the sheet being fed at an angle is provided with corrugations during its travel and prior to being united with the base sheet. In the manufacture of a laminated fibrous board, particularly a board having a corrugated ply, or plies, it has been found that, in building up the multi-ply structure, if the base sheet is bent, lateral movement may take place between adjacent sheets and distortion and displacement of the sheets comprising the board would result.

The present invention is particularly designed to overcome this objection by providing a method of manufacturing a laminated fibrous structure whereby movement of the base sheet, whether it comprises adhesively united flat sheets or flat and corrugated sheets, is maintained in a straight line and the added sheets, whether flat or corrugated, are fed at an angle and joined to said base sheet, from which point the multi-ply structure moves in the same straight line.

One particular embodiment of the invention contemplates the continuous production of a laminated fibrous structure provided with corrugated plies and uncorrugated plies, in which the corrugated plies may be interposed between uncorrugated plies, or vice versa.

Many advantages and objects of the present invention will be hereinafter more completely set forth.

In the drawings, Fig. 1 is a cross sectional diagrammatic view of the apparatus.

Fig. 2 is a cross sectional view illustrating a five ply corrugated board in accordance with the present invention.

Fig. 3 is an enlarged fragmentary cross sectional diagrammatic view of a part of the machine shown in Fig. 1.

Fig. 4 is a perspective view of the construction shown in Fig. 2.

Fig. 5 is a view similar to Fig. 1, illustrating the production of a nine ply corrugated board.

Fig. 6 is an enlarged fragmentary cross sectional view illustrating the relation between the corrugated elements.

Fig. 7 is a fragmentary front elevational view of one of the corrugating elements illustrating the method of stripping the corrugated sheet therefrom.

Fig. 8 is a fragmentary sectional view illustrating the nine ply board made by the machine shown in Fig. 5.

Referring more in detail to the drawings, 1 designates the shaft carrying sprockets 2. The shaft 1 is driven by any suitable means such as a pulley and belt connection. An endless chain or element designated as a whole 3, is adapted to have registering engagement with the sprocket 2. It is to be understood that the views shown in the drawing are diagrammatic, and that there are preferably two sprockets, one on each side of the shaft 1, and at least two chains 3.

Extending transversely across the machine and carried by the chains 3 are connected bars 4 provided on their upper surface with corrugating means as shown at 5. The sprocket chains 3 register with the idler sprockets 6 mounted on the shaft 7. The diameter of the sprockets 6 is less than the diameter of the sprocket 2, the upper plane of the sprocket 6 being so positioned that it is in substantially the same horizontal plane as the upper plane of the sprocket 2. By this arrangement, the corrugating portions 4 in passing around the shaft 7 are caused to travel downwardly in a plane disposed at an angle to preferably a horizontal plane. The purpose of this will be hereinafter more completely described.

In the view shown in Fig. 1 there are two sets of oppositely arranged endless chains and corrugating bars 4 mounted for synchronized movement relative to each other. A corrugating roll 8 mounted on the shaft 9 is positioned immediately adjacent the sprocket 6, the corrugating elements on the surface of which are adapted to register with the corrugating elements 5 in the bars 4. A strip of fibre board 10 is fed between the corrugating roll 8 and corrugating bars 4 in a plane disposed at an angle to the horizontal. Thus, when the corrugating roll 8 and corrugating bars 5 register, the sheet 10 passing therethrough is corrugated in said plane.

In practice, it has been found preferable to cause the newly corrugated sheet to have registering engagement with the corrugating bars 4, in order that the corrugations will not flatten out.

To facilitate the stripping of the corrugated sheet from the roller 8, the surface of said roll may be longitudinally grooved, as shown at 11. The stripping elements 12 are adapted to ride in the grooves 11 (Fig. 6) in order to facilitate the stripping of the corrugated sheet from the roll 8 so that same may be carried along in register with the corrugating bars 4. A spring plate 13 is held against the surface of the newly corrugated sheet by means of bars 14. It will thus be apparent that the newly corrugated sheet is prevented from flattening out.

An uncorrugated sheet 15 is fed between the two oppositely disposed corrugated sheets travelling inwardly toward the horizontal. Means for applying adhesive to the upper and lower surfaces of this sheet are diagrammatically illustrated at 16 and 17. At the point where the corrugated sheets and uncorrugated sheet 15 are brought together, I preferably provide pressure means illustrated diagrammatically at 18, for the purpose of uniting the corrugated sheets to the plain surface sheet so that a unitary structure is produced. Further travel from this point may be in a straight line, preferably in a horizontal plane, as shown, it being preferable to still maintain the corrugating bars 4 in registering relation with the corrugated sheets in order that the composite unit may set, due to the adhesive, and to prevent any elongation or flattening of the corrugations.

It may be pointed out that the oppositely disposed corrugating rolls 8 are of the same size, and are driven in timed relation in order that the crowns of the oppositely disposed corrugated sheets will always register. It may be further pointed out that in starting the machine, slight adjustments may be made in the sprockets 2 in order that the crowns of oppositely disposed corrugated sheets will always register.

After the composite sheet has moved forward for a length of time sufficient to cause the adhesive to set, the sheet leaves the corrugating bars 4 and passes to a means for applying the uncorrugated surface sheets thereto, as will now be explained. These surface sheets designated 19, are provided on a surface of each, with adhesive, by means such as shown diagrammatically at 20. These sheets are fed between endless belts 21 rotating around spaced rolls 22 and 23. The belt 21 and rolls 22 and 23 are so arranged as to impose a pressure against the surface sheets 19 to cause same to adhere to the previously made corrugated unit. The complete sheet is withdrawn from the other end, and may be ready for use.

In the foregoing description I have described the production of a five ply corrugated sheet, comprising uncorrugated surface plies, an uncorrugated central ply, and corrugated plies therebetween. The invention contemplates the production of a corrugated sheet comprising two uncorrugated surface sheets and a central corrugated sheet. This latter sheet can be produced by obvious manipulation of the machine.

By causing the corrugating action to take place in a plane disposed at an angle to the base sheet travelling in a straight line, I eliminate relative motion between the various sheets comprising the base sheet. In this manner, by carrying the relatively rigid board (the base) in a straight line and thereafter joining relatively flexible sheets thereto, relative motion between the sheets comprising the base is prevented.

Referring more particularly to the drawing shown in Fig. 5, it may be desirable to produce a corrugated sheet having more than five plies, for instance, nine plies. Where this is desired, the five ply sheet produced by the machine shown in Fig. 1 is fed to an identically similar machine as shown in Fig. 5, and the same identical operations carried out, which need not be described in detail.

For the purpose of convenience, like parts in Figs. 1 and 5 have been designated by the same reference characters.

It will be apparent to those skilled in the art, that the present method and apparatus will be economical in manufacture, and is capable of continuously producing a maximum supply of corrugated board.

As a feature of the present invention the adhesive preferably used is one which possesses waterproofing qualities such, for instance, as bitumen, and more particularly asphalt and the like. It will be immediately apparent to those skilled in the art that by applying a coating of adhesive possessing waterproofing qualities to desired surfaces of the plain sheet, or sheets, that water repellant barriers or areas are thus provided throughout the composite corrugated sheet in the form of continuous films. In addition, the outer surfaces of the corrugated board may be preferably free from any waterproofing material, thus permitting the absorption of a certain amount of moisture, but preventing this moisture from penetrating into the body of the composite board.

The invention also contemplates that the corrugated sheets may have been previously impregnated or saturated with the water repellant material, although for the purpose of this invention, it is desirable that the sheets to be corrugated be relatively dry to avoid sticking and gumming of the corrugated forming means.

In the preferred method of operation, the sheet, or sheets, moving in a straight line will preferably move on a horizontal plane because of natural convenience. The invention, however, is not limited to a method in which the sheets moving in a straight line move in a horizontal plane, since they may move in a straight line vertically, or may move in a straight line between the horizontal and the vertical.

I claim as my invention:

1. A process of making corrugated board, which comprises feeding a sheet of material to be corrugated in a plane at an angle sloping in a straight line to the horizontal, acting on said sheet while moving in said plane to produce corrugations therein, and causing said corrugated sheet to be carried forward in a horizontal plane in such a manner and for such a distance as to prevent collapse of the newly formed corrugations until the latter are set.

2. A process of making corrugated board, which comprises feeding a sheet of material to be corrugated in a plane disposed at an angle sloping in a straight line to the horizontal, acting on said sheet while moving in said plane to produce corrugations therein, causing said corrugated sheet to be carried forward in a horizontal plane for a distance and in such manner as to prevent collapse of the newly formed corrugations until the latter are set, introducing a strip of uncorrugated material and uniting the two sheets.

3. A process which comprises feeding a sheet of relatively flexible material to be corrugated at an angle to a continuously moving base sheet moving in a straight line, producing corrugations in said flexible material and causing said corrugated sheet to be then joined to the base sheet and carried forward in the plane of travel of said base sheet in such a manner and for such a distance as to prevent collapse of the corrugations.

In testimony whereof I affix my signature.

HARRY A. CUMFER.